Figure 1:
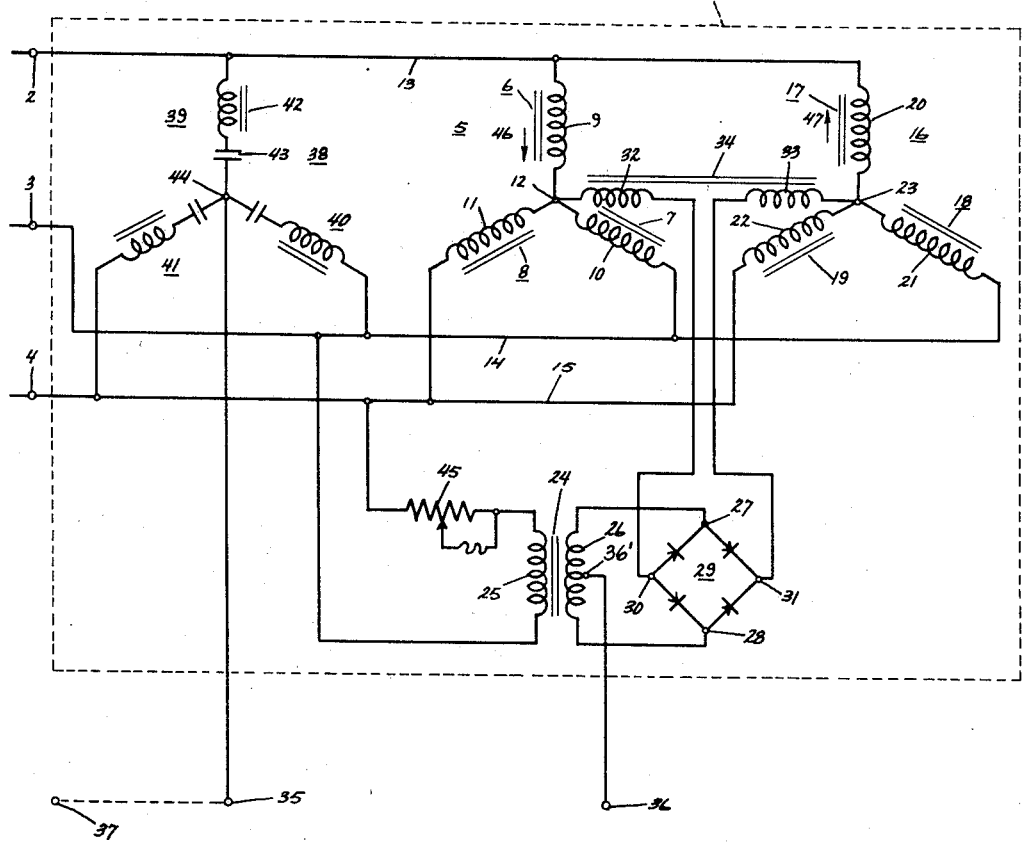

Nov. 3, 1959    H. L. KELLOGG    2,911,582
STATIC MAGNETIC FREQUENCY MULTIPLIER
Filed Nov. 20, 1957    2 Sheets-Sheet 1

Inventor:
Harry L. Kellogg,
by Harry F. Manbeck, Jr.
His Attorney.

Inventor:
Harry L. Kellogg,
by Harry F. Manley
His Attorney.

United States Patent Office 2,911,582
Patented Nov. 3, 1959

2,911,582

STATIC MAGNETIC FREQUENCY MULTIPLIER

Harry L. Kellogg, Fort Wayne, Ind., assignor to General Electric Company, a corporation of New York Application November 20, 1957, Serial No. 697,655

6 Claims. (Cl. 321—7)

This invention relates to static magnetic frequency multipliers and more particularly to frequency multipliers of the type commonly referred to as "triplers" and having biased magnetic cores.

There are many instances where it is desirable to provide a source of alternating current having a frequency considerably higher than that commonly supplied by utilities, (60 cycles per second in the United States) e.g., for the operation of magnetic amplifiers, induction motors, and fluorescent lighting. Alternating current power at higher frequencies may be provided by rotating equipment, for example, an alternating current motor operating from a commercial source of power and driving a higher frequency alternator. However, rotating equipment inherently requires maintenance and is generally large and heavy. It has therefore been desirable to provide static equipment for frequency multiplying purposes which is maintenance-free and thus may be installed in relatively inaccessible locations.

Many static frequency multiplying circuits have been devised utilizing combinations of transformers and reactors. A common form of static magnetic frequency multiplier is referred to as a "tripler" since when connected to a source of three phase alternating current, it provides a single phase output having a frequency of three times the input frequency. It will be recalled that it has been long known that in a three phase transformer having Y-connected windings, a third harmonic voltage appears between the mid-point of the Y-connected primary windings and system neutral, the magnitude of which is dependent upon the degree of saturation of the core of the transformer. Numerous tripling circuits have been devised which utilize this phenomenon, these circuits generally employing three Y-connected saturable core reactors, each reactor having an output winding, the output windings being serially connected to supply the load. The cores of such Y-connected saturable core reactors have been biased, either by separate bias windings or by impressing a direct current bias voltage on the output windings. A single Y-connected group of reactors provides a saw-tooth output voltage wave form and in order to provide a more satisfactory wave form, it has been common practice to connect two groups of Y-connected saturable core reactors in parallel thereby providing a substantially square output wave form. While these circuits have generally been employed with three phase inputs, three phase power being commercially available, the same phenomenon may be employed to multiply polyphase inputs having more than three phases by utilizing star-connected saturable core reactors, the number of saturable core reactors being equal to the number of phases. In such an arrangement, the output is still single phase and at a frequency which is the multiple of the number of input phases; for example five saturable core reactors could be employed with a star connection to a five phase input and the output frequency would thus be five times the input frequency.

In the past, in order to provide a bias for the cores of the saturable core reactors, it has been necessary to employ a bias winding on each reactor, thus adding appreciably to the overall cost of the multiplier. It is therefore desirable to provide a static magnetic frequency multiplier of the "tripler" type in which the cores can be biased without the necessity of providing separate bias and output windings.

It is therefore an object of this invention to provide an improved static magnetic frequency multiplier.

Another object of this invention is to provide an improved static magnetic frequency multiplier of the "tripler" type.

Yet another object of this invention is to provide an improved static magnetic frequency multiplier of the "tripler" type and having biased cores in which the bias windings for the cores employed in prior multipliers are eliminated.

Further objects and advantages of this invention will become apparent by reference to the following description and the accompanying drawing and the features of novelty which characterize this invention will be pointed out with particularity in the claims annexed to and forming a part of this specification.

This invention in its broader aspects provides a static magnetic frequency multiplier having a plural phase alternating current input. Two groups of star-connected saturable core reactors are provided respectively connected to the input phases and a bias circuit is provided for impressing a source of direct current bias voltage between the neutrals of the two groups of reactors. Choke means are serially arranged in the bias circuit and a load circuit is provided having one side connected in circuit with the bias circuit and its other side connected to the source neutral.

Figure 2A:
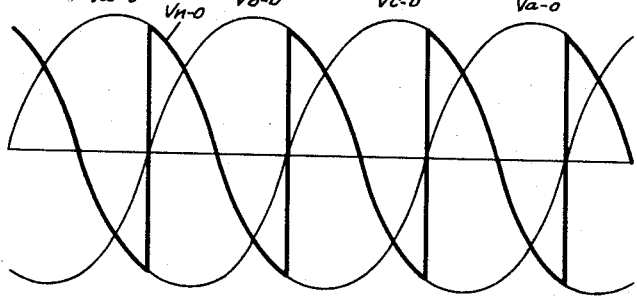
Figure 2B:
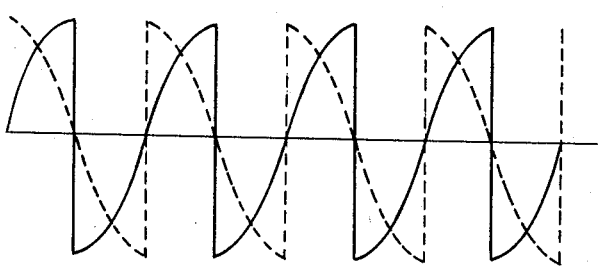
Figure 2C:
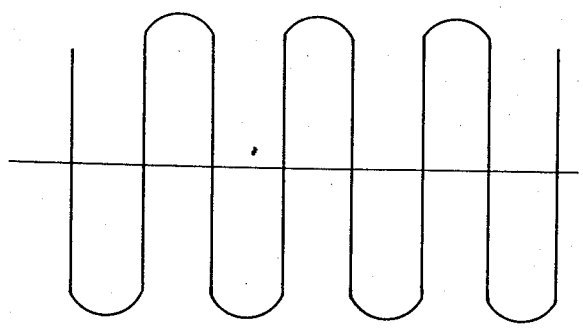
Figure 3A:
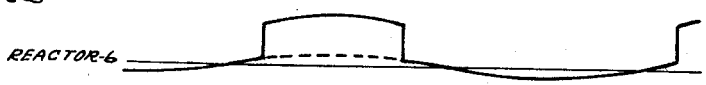
Figure 3B:
Figure 3C:

In the drawing, Fig. 1 is a schematic illustration of an embodiment of this invention having a three phase input;

Figs. 2a through 2c show the multiplied voltage output of each group of saturable core reactors and the composite output voltage wave form of the circuit of Fig. 1; and Figs. 3a through 3c show the magnetizing current for the three reactors respectively of one of the groups of reactors of the circuit of Fig. 1.

Referring now to Fig. 1 of the drawings, the improved static magnetic frequency multiplier, generally identified as 1, has three input terminals 2, 3, and 4, respectively adapted to be connected to a suitable three phase source of alternating current power (not shown). A first group 5 of three Y-connected saturable core reactors 6, 7 and 8 is provided having their windings 9, 10 and 11 connected together at their inner ends to form neutral 12 and having their outer ends respectively connected to lines 13, 14, and 15 which are in turn respectively connected to input terminals 2, 3, and 4. A second group 16 of three Y-connected saturable core reactors 17, 18, and 19 is provided having their windings 20, 21, and 22 respectively likewise connected together at their inner ends to form neutral 23 and having their outer ends respectively connected to lines 13, 14, and 15.

In order to provide a direct current bias for the saturable core reactor groups 5 and 16, a transformer 24 is provided having its primary winding 25 connected across lines 14 and 15 and thus energized from one phase of the three phase source of input power. Secondary winding 26 of transformer 24 has its ends connected to input corners 27 and 28 of bridge rectifier 29. The output corners 30 and 31 of bridge rectifier 29 are respectively connected to neutral points 12 and 23 of saturable core reactor groups 5 and 16 with choke coils 32 and 33, which may be arranged on a common core 34, being respectively connected in series as shown. A path for the direct current bias is thereby formed from one corner 31 of the bridge rectifier 29 through one choke coil 33; to the midpoint 23 of the second group 16 of Y-connected saturable core reactors; through the respective saturable core reactors, for example, reactor 17 to its respective line 13 and then to the associated reactor 6 of the first group 5 of saturable core reactors; to the midpoint 12 of the first group 5 of saturable core reactors; through choke coil 32 to corner 30 of rectifier 29. In this manner, opposite direct current bias is provided in each group 5, 16 of saturable core reactors, as more fully hereinafter explained.

A pair of output terminals 35 and 36 are provided, output terminal 36 being connected to center tap 36' of secondary winding 26 of transformer 24. If the external source of power is provided with a neutral, as at 37, the other output terminal 35 is directly connected thereto as shown by the dotted lines in Fig. 1. On the other hand, if the external source of three phase alternating current power does not have a neutral, a neutral may be provided by a neutral-establishing network 38 which is shown as having three Y-connected impedance legs 39, 40, and 41. Each of the impedance legs is composed of a serially connected reactor 42 and capacitor 43; these two elements are tuned to the third harmonic of the input frequency so as to lower the source impedance. While the capacitors 43 can be used by themselves, the addition of the reactors 42 to effect a tuned circuit provides a much more effective arrangement. The impedance legs have their inner ends connected to neutral point 44 and their outer ends respectively connected to lines 13, 14 and 15. Under these conditions, output terminal 35 is connected to neutral point 44 of neutral-establishing network 38. Variable resistor 45 in series with primary winding 25 of transformer 24 is utilized selectively to adjust the bias level of saturable core reactor groups 5 and 16.

Referring now in addition to Figs. 2 and 3, the mode of operation of the multiplier of Fig. 1 will be explained. It will be readily understood that in the arrangement shown, it is inherent that only one of the saturable core reactors in any one of the two groups may be saturated and thus have extremely low impedance at any given time since if two of the reactors were saturated, an essentially short circuit would be provided across one of the phases of the three phase source of supply. In Fig. 2a there is shown the voltage applied to the reactors of one of the two groups, for example, group 5. For the sake of simplicity, the source voltage applied across reactor 6 is referred to as $Va$—$o$, the source voltage applied to reactor 7 is referred to as $Vb$—$o$ and the source voltage applied to reactor 8 is referred to as $Vc$—$o$. It will readily be seen that when the reactor 6 is saturated, its winding 9 will have extremely low impedance and thus the neutral point 12 will be at substantially the same potential as line 13. Since only one reactor in group 5 can be saturated at a time, during one complete cycle of applied voltage, it will be seen that each of the reactors 6, 7 and 8 will be saturated during 120° of a cycle of applied voltage. For a reason which will be explained hereinafter, reactor 6 will become saturated after 120° of the applied voltage $Va$—$o$ and will remain saturated for the next 120° at which point reactor 7 will become saturated and in turn will remain saturated for the next 120° at which time the remaining reactor 8 will become saturated, each reactor in turn going out of saturation as the next reactor goes into saturation. As is indicated above, when reactor 6 is saturated, neutral point 12 will be essentially at the potential of line 13 and thus the potential of neutral point 12 will follow the curve of the source voltage applied to reactor 6 during the time that reactor is saturated. When reactor 7 becomes saturated, neutral point 12 will suddenly become essentially the same potential as line 14 and will therefore follow the curve of the applied voltage of line 14 during the period in which reactor 7 is saturated. Likewise, when reactor 8 becomes saturated, neutral point 12 will suddenly jump to essentially the potential of line 15 and will follow the curve of the applied voltage on line 15 during the period in which reactor 8 is saturated. The potential of neutral point 12 during a cycle of applied voltage is therefore shown on Fig. 2a in heavy line and it will immediately be seen that this potential has a saw-toothed wave form and a frequency three times the applied frequency. It is thus seen that a voltage appears between neutral point 12 and the system neutral 37 having a frequency and wave form as shown by the heavy solid line in Fig. 2a.

The side of the voltage curve which the neutral point 12 follows as the three reactors go into and out of saturation is dependent upon the polarity of the direct current bias. Assuming that terminal 30 of bridge rectifier 29 is negative and terminal 31 is positive, as shown in Fig. 1, it will be seen that bias in winding 9 will be in the direction shown by the arrow 46 while the bias in winding 20 will be in the direction shown by the arrow 47, it being readily understood that a complete circuit for the flow of bias current is provided between neutral 12, winding 9, line 13, winding 20 and neutral 23. Similar parallel circuits are provided by the remaining windings of groups of reactors and the other two lines 14 and 15. Thus, the saw-toothed, triple frequency potential between neutral 12 of Y-connected saturable core reactor group 5 and system neutral 37 is as shown in solid lines in Fig. 2a and in dotted lines in Fig. 2b; the potential between neutral 23 of reactor group 16 and system neutral 37 will be in the opposite direction, i.e., following the other sides of the applied voltage curves as shown in solid lines on Fig. 2b. As will be apparent from Fig. 1, the two saturable core reactor groups 5 and 16 are connected in parallel and thus the voltages appearing between neutral point 12 of saturable core reactor group 5 and the system neutral 37 and neutral point 23 of saturable core reactor group 16 and the system neutral 37 are combined to provide a composite output voltage wave form as shown in Fig. 2c.

The transformer 24 and bridge rectifier 29 serve a two fold function: (1) as a source of direct current bias for the reactors, and (2) as a means of "collecting" the third harmonic from the neutrals of the Y-connected reactors. From a direct current standpoint, a current is drawn by transformer 24 from lines 3 and 4, transformed, and passed through the bridge rectifier 29, thereby supplying a source of direct current passing through the chokes 32 and 33 and to the neutrals 12 and 23 of the Y-connected reactors, as heretofore described. Superimposed upon this direct current wave is an alternating current, the third harmonic of the base frequency, which is picked off from the neutrals 12 and 23 of the Y-connected reactors. This superimposed harmonic appears as an alternating current ripple at the midpoint of winding 26 of transformer 24 and is picked off at center tap 36'. Therefore, viewing the system from the alternating current standpoint, the center tap of transformer 24 is connected midway between the points 12 and 23 of the Y-connected reactors thereby connecting the groups 5 and 16 of reactors in parallel.

Referring now to Figs. 3a, b and c, the reason for each reactor being saturated during only 120° of a complete cycle of applied voltage and for its going into saturation at 120° after the beginning of the positive half cycle of applied voltage will be explained. It must immediately be recalled that reactors of the type here under consideration in their unsaturated condition have very high impedance and thus very low magnetizing current. It will also be observed that the current flowing in any one reactor winding, for example, winding 9 of reactor 6, must be the algebraic sum of the bias current and the currents flowing in the windings 10 and 11 of the other two reactors 7 and 8. With these principles in mind, reference should be made to the first 120° interval of Fig. 3c. This figure shows the actual magnetizing current flowing in winding 11 of saturable core reactor 8 in a heavy solid line and the dotted line shows the magnetizing current which would normally flow if there were no bias current flowing in winding 11. It is known that one of the saturable core reactors must be saturated at any given time since bias current must flow in one of the windings. Reference to Fig. 2a will show that reactor 8 is saturated during the first 120° interval of Va—o since neutral point 12 was following the applied voltage curve Vc—o which was stated to be the applied voltage on winding 11 of reactor 8. Since reactor 8 is saturated, and thus, its winding 11 has extremely low impedance, the maximum possible current will be flowing therethrough, which current is the algebraic sum of the bias current and the magnetizing current flowing in windings 9 and 10 of reactors 6 and 7 which are unsaturated. It will be seen that if the normal magnetizing current, i.e., the current which would flow in winding 11 of reactor 8 if no bias current were provided, as shown by the dotted line in Fig. 3c, were flowing, it would lag the applied voltage Vc—o by 90° since the circuit is substantially inductive and thus the normal magnetizing current will pass through the zero line going positive after 90° of the applied voltage Vc—o. The fundamental component of actual magnetizing current must also lag the applied voltage by 90°. It will here be recalled that the volt-seconds induced in any given reactor over a full cycle of applied voltage must average out to zero. If reactor 8 was merely connected to a single phase source, it could be made to go into saturation at 120° of applied voltage by suitable adjustment of its volt-second characteristic. When the three reactors 6, 7 and 8 with D.-C. bias are connected to a three phase source, however, it is found that the 120° point of applied voltage is the only point at which the reactor can go into saturation and remain saturated for 120° and have the volt seconds induced over the remaining 240° average out to zero. Then, while the core of reactor 6 has been unsaturated during the first 120° of applied voltage, at the 120° point, reactor 6 will suddenly go into saturation and the magnetizing current therethrough will suddenly become positive increasing as shown in Fig. 3a. This increased magnetizing current in winding 9 of reactor 6 must as previously stated, be the algebraic sum of the bias current and the currents in windings 10 and 11 of reactors 7 and 8. This sudden increase in current in winding 9 of reactor 6 will cause the current in winding 11 of reactor 8 to suddenly decrease and this will unsaturate the previously saturated reactor 8; reactor 7 remains unsaturated. The magnetizing current in winding 9 of the saturated reactor 6 will, however, be limited by the choke in the bias circuit and by the high impedance of the other two reactor windings by virture of their unsaturated condition. Reactor 6 will now remain saturated for 120° and would tend to remain saturated for an even longer period of time, were it not for the fact that after 120° of the applied voltage Vb—o on reactor 7, that reactor will suddenly go into saturation as shown in Fig. 3b and the greatly increased current flowing therethrough will cause reactor 6 to become unsaturated as shown in Fig. 3a. Reactor 7 will likewise remain saturated for 120° at which point reactor 8 becomes saturated thus causing the desaturation of reactor 7.

It is now seen that each reactor of each of the two groups of reactors will be saturated for 120° of a cycle of applied voltage and unsaturated during the remaining 240° with only one of the reactors being saturated in any given instant. It is further seen that each reactor goes into saturation after 120° of a cycle of its applied voltage thus giving the output wave form shown in Fig. 2a.

A circuit in accordance with Fig. 1 has been constructed for operation from a three phase source of applied voltage. In this circuit, each of the saturable core reactors 6, 7 and 8, and 17, 18, and 19 had an unsaturated inductance of 1.7 henries and was formed of 174 turns of .175 inch x .100 inch conductor wound on cores respectively having a stack height of 3.25 inches, a length of 12 inches, and a width of 4.88 inches with coil windows 1.88 by 6.0 inches. Transformer 24 had an input voltage of 480 and an output voltage of 15 volts, the bias voltage output between output corners 30 and 31 of rectifier 29 being 10 volts. The chokes 32 and 33 were respectively formed of 88 turns of .125 inch x .090 inch conductor and core 34 had a stack height of 2.5 inches and was 6.75 inches wide by 5.63 inches long with 2 windows 1.125 by 3.38 inches. Chokes 32 and 33 respectively had an inductance of .04 henries. Capacitors 43 of the neutral-establishing network 38 respectively had a capacitance of 78 microfarads. Reactors 42 were not used in the test; however, a representative value would be approximately .01 henry. This omission is permissible, as described above, the capacitors 43 lowering the impedance sufficiently for test purposes.

My improved frequency multiplier circuit not only simplifies the construction of the reactors and the overall circuit by virtue of the complete elimination of separate bias and output windings for the reactors, but I have also found that the rating factor is improved by approximately 30 percent since the magnetizing and load currents and the bias current of each reactor are combined in one winding.

While this invention has been illustrated and described as applied to a tripler circuit, as indicated above, it will readily be understood that the invention is equally applicable to a frequency multiplier having a higher number of input phases and a consequently higher frequency output.

While I have illustrated and described a specific embodiment of this invention, further modifications and improvements will occur to those skilled in the art. I desire that it be understood that this invention is not limited to the particular form shown and I intend in the appended claims to cover all modifications which do not depart from the spirit and scope of this invention.

What I claim as new and desire to secure by Letters Patent of the United States is:

1. A static magnetic frequency multiplier comprising: a plurality of input terminals adapted to be connected to a plural phase source of alternating current of predetermined frequency; a first group of star-connected saturable core reactors having their windings respectively connected to said input terminals; a second group of star-connected saturable core reactors having their windings respectively connected to said input terminals; a bias circuit for impressing a source of direct current bias voltage between the neutrals of said first and second groups of reactors for providing a direct current bias for said reactors; choke means serially arranged in said bias circuit; and a single phase load circuit having one side connected in circuit with said bias circuit and the other side adapted to be connected to the neutral of said source.

2. A static magnetic frequency multiplier comprising: a plurality of input terminals adapted to be connected to a plural phase source of alternating current of predetermined frequency; a first group of star-connected saturable core reactors having their windings respectively connected to said input terminals; a second group of star-connected saturable core reactors having their windings respectively connected to said input terminals; a bias circuit for impressing a source of direct current bias voltage between the neutrals of said first and second groups of reactors for providing a direct current bias for said reactors; choke means serially arranged in said bias circuit; a neutral-establishing network connected to said input terminals; and a single phase load circuit having one side connected in circuit with said bias circuit and the other side connected to the neutral of said neutral-establishing network.

3. A static magnetic frequency multiplier comprising:

a plurality of input terminals adapted to be connected to a plural phase source of alternating current of predetermined frequency; a first group of star-connected saturable core reactors having their windings respectively connected to said input terminals; a second group of star-connected saturable core reactors having their windings respectively connected to said input terminals; a source of direct current bias voltage having its sides respectively connected to the neutrals of said first and said second groups of reactors for providing a direct current bias for said reactors; chokes respectively connected in series with each of said bias voltage source sides; said source of bias voltage having a center-tap connection; and a single phase load circuit having one side connected to said center tap and the other side adapted to be connected to the neutral of said source.

4. A static magnetic frequency multiplier comprising: a plurality of input terminals adapted to be connected to a plural phase source of alternating current of predetermined frequency; a first group of star-connected saturable core reactors having their windings respectively connected to said input terminals; a second group of star-connected saturable core reactors having their windings respectively connected to said input terminals; a transformer having its primary winding connected across two of said input terminals for energization from one phase of said source, full wave rectifying means connecting a secondary of said transformer to the neutrals of said first and second groups of reactors for providing a direct current bias for said reactors; a pair of chokes respectively connecting in series between said neutrals and said rectifying means; and a single phase load circuit having one side connected to a center tap on said transformer secondary winding and its other side adapted to be connected to the neutral of said source.

5. A static magnetic frequency multiplier comprising: a plurality of input terminals adapted to be connected to a plural phase source of alternating current of predetermined frequency; a first group of star-connected saturable core reactors having their windings respectively connected to said input terminals; a second group of star-connected saturable core reactors having their windings respectively connected to said input terminals; a transformer having its primary winding connected across two of said input terminals for energization from one phase of said source; a bridge rectifier having its input corners respectively connected to the ends of the secondary winding of said transformer and its output corners respectively connected to the neutrals of said first and second groups of reactors for providing a direct current bias for said reactors; a pair of choke coils respectively connected in series between said neutrals and said output corners of said rectifier; and a single phase load circuit having one side connected to a center tap on said transformer secondary winding and its other side adapted to be connected to the neutral of said source.

6. A static magnetic frequency multiplier comprising: a plurality of input terminals adapted to be connected to a plural phase source of alternating current of predetermined frequency; a first group of star-connected saturable core reactors having their windings respectively connected to said input terminals; a second group of star-connected saturable core reactors having their windings respectively connected to said input terminals; a transformer having its primary winding connected across two of said input terminals for energization from one phase of said source; a bridge rectifier having its input corners respectively connected to the ends of the secondary winding of said transformer and its output corners respectively connected to the neutrals of said first and second groups of reactors for providing a direct current bias for said reactors; a pair of choke coils respectively connected in series between said neutrals and said output corners of said rectifier; a star-connected neutral-establishing impedance network having its ends respectively connected to said input terminals; and a pair of output terminals respectively connected to a center tap on said transformer secondary winding and a neutral of said network adapted to be connected to supply single phase power to a load at a frequency which is a multiple of said predetermined frequency, said multiple being the number of phases of said source.

References Cited in the file of this patent

UNITED STATES PATENTS

| | | |
|---|---|---|
| 2,683,854 | Conrath | July 13, 1954 |
| 2,820,942 | Depenbrock | Jan. 21, 1958 |